Aug. 5, 1924. Re. 15,883

E. J. VON PEIN

CASH REGISTER

Original Filed April 21, 1919 5 Sheets-Sheet 1

Inventor
Edward J. Von Pein
By Earl Beust
Henry E. Stauffer
His Attorneys

Aug. 5, 1924.

Re. 15,883

E. J. VON PEIN

CASH REGISTER

Original Filed April 21, 1919 5 Sheets-Sheet 2

Inventor
Edward J. Von Pein
By Earl Benoit
Henry E. Stauffer
His Attorneys

Aug. 5, 1924. Re. 15,883
E. J. VON PEIN
CASH REGISTER
Original Filed April 21, 1919 5 Sheets-Sheet 3
FIG. 3
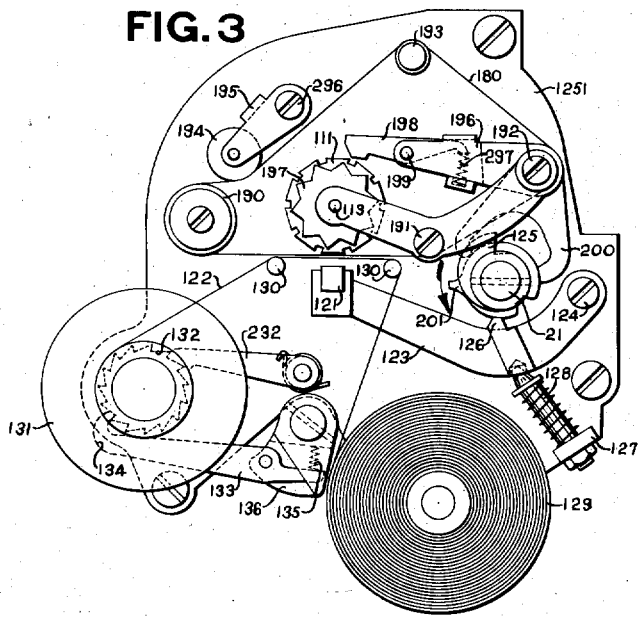
FIG. 4
| | | |
|---|---|---|
| 05 | 01 | |
| 10 | 01 | |
| 15 | 02 | |
| 20 | 00 | 122 |
| 25 | 03 | |
| 142 30 | 00 | 141 |
| 139 00 | 00 | 140 |
| 40 | 04 | |
| 50 | 00 | |
| 64 | 07 | |
| 78 | 08 | |
| 02 | 01 | |
| 1.20 | 12 | |
| 51 | 06 | |
| 93 | 10 | |
| 47 | 05 | |
| 137 | 138 | |
FIG. 2
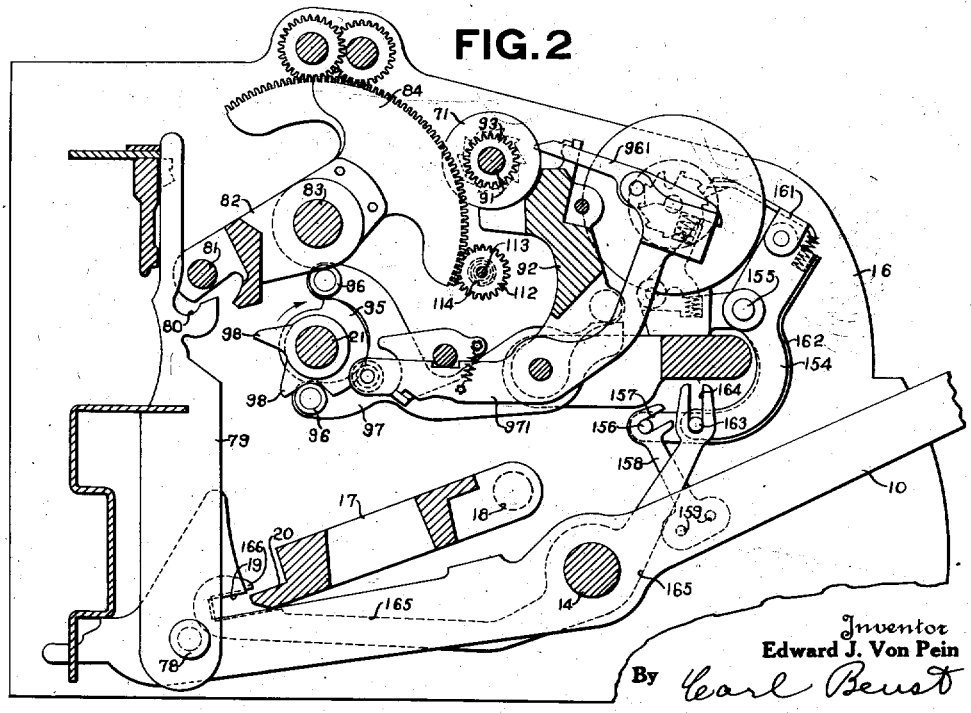
Inventor
Edward J. Von Pein
By Earl Beust
Henry E. Stauffer
His Attorneys Aug. 5, 1924.

Re. 15,883

E. J. VON PEIN

CASH REGISTER

Original Filed April 21, 1919

5 Sheets-Sheet 4

Inventor
Edward J. Von Pein

By Earl Beust
Henry E. Stauffer

His Attorneys

Aug. 5, 1924.

Re. 15,883

E. J. VON PEIN

CASH REGISTER

Original Filed April 21, 1919 5 Sheets-Sheet 5

Inventor
Edward J. Von Pein

By Pearl Benst
Henry E. Stauffer

His Attorneys

Reissued Aug. 5, 1924. Re. 15,883

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO.

CASH REGISTER.

Original No. 1,371,653, dated March 15, 1921, Serial No. 291,433, filed April 21, 1919. Application for reissue filed May 23, 1924. Serial No. 715,492.

*To all whom it may concern:*

Be it known that I, EDWARD J. VON PEIN, a citizen of the United States, and resident of Dayton, in the county of Montgomery, State of Ohio, have invented certain new and useful Improvements in Cash Registers, of which I declare the following to be a full, clear, and exact description.

This invention relates to improvements in cash registers and has more particular relation to the type of cash registers shown and described in Letters Patent of the United States issued to Thomas Carney May 23, 1893, and numbered 497,860, and also in the United States Letters Patent to Joseph P. Cleal No. 718,565, issued January 13, 1903.

The general operation and construction of the machine shown in the present application is substantially like that shown in the Carney and Cleal patents.

The purpose of the present machine is to enable a proprietor of a store selling taxable goods to keep an account of the sale of all goods upon which there is placed a Government tax and also to keep account of the proper tax which is collectable by the revenue department of the Government on the sale of such goods.

In the accomplishment of this object the machine is arranged to enable the proprietor to register simultaneously both the amount of a purchase and the amount of proper tax to be applied thereto.

It is a further object of the machine to provide not only for the registration of the amount of the purchase and the amount of the tax assessable on the purchase, but also to make a printed record of both the amount of the tax and the amount of the purchase and to indicate both the said amounts.

As it frequently occurs that a sale of goods on which no tax is assessed is to be handled by the same cash register as that which handles the sales of taxable goods the machine is so arranged as to enable the proprietor to make a record of the sale of non-taxable goods and also to make a record of the fact that no tax has been registered in connection with that sale.

As it is desired in order to compel a clerk or operator of the cash register to make the proper records in the machine the machine is so arranged as to compel the clerk or operator to make a record not only of the amount of the purchase but also the amount of the assessable tax, or in case the sale involves goods against which no tax is to be assessed to make a proper record of the fact as well, so that the printed records of the machine and also the public indication will clearly show the amount of the purchase, the assessable tax, or in lieu of the latter, some character or symbol to indicate that no tax is assessable.

With these and incidental objects in view the invention consists in certain novel features of construction and combinations of parts, the essential elements of which are set forth in appended claims and a preferred form of embodiment of which is hereinafter described with reference to the drawings which accompany and form part of this specification.

Of said drawings:

Figs. $1^A$ and $1^B$ taken together constitute a top plan view of the machine with the cabinet and certain parts omitted for the sake of clearness.

Fig. 2 is a cross section of the machine taken approximately on the line 2—2 of Fig. $1^B$, looking in the direction of the arrows.

Fig. 3 is a side view of the printing mechanism shown on the right hand end of the machine in Fig. $1^B$.

Fig. 4 is a portion of a detail strip printed by the printing mechanism shown in Figs. $1^B$ and 3.

Figure 1A:
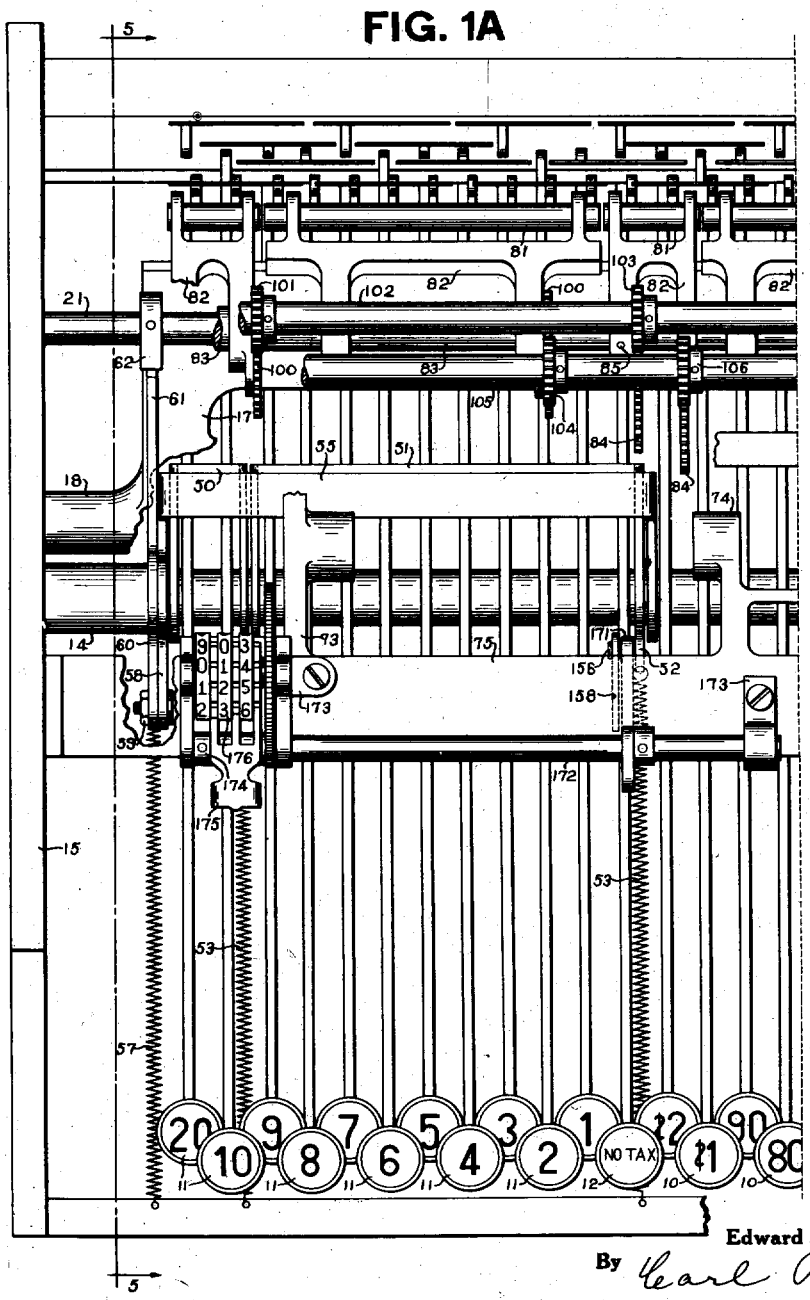

The machine in general comprises banks of depressible keys, certain banks representing the amount of tax, and other banks representing the amount of the purchase. The operation of the machine comprises an initial depression of one of the tax keys which will serve to unlock the keys representing the amount of purchase thereby permitting the operation of the purchase keys. The operation of the purchase keys will, through mechanism common to the tax keys and purchase keys, effect a complete operation of not only the purchase keys but those of the tax keys which have been initially operated.

Separate totalizers are provided for the tax keys and the purchase keys whereby the amount of the tax and the amount of the purchase will be registered separately on their proper totalizers.

When it is desired to operate a purchase key to record a purchase of goods which is non-taxable, a "no tax" key is provided which serves to disable the locking mechanism which normally prevents the operation of the purchase keys thereby permitting the operation of a purchase key. This will result in registering the purchase on the purchase totalizer while no entry is made on the tax totalizer.

The usual indicators for this type of machine are provided for all of the keys of the register so as to indicate to the public which of the keys both of the tax and purchase groups have been operated.

Simultaneously with the registration of the amounts on their proper totalizers a printing of these amounts is effected by the printing mechanism, the amount of tax and the amount of the purchase being printed in separate columns on said strip.

Described in detail the machine comprises a series of amount or purchase keys 10, a series of tax keys 11, a "no tax" key 12 and a "no sale" key 13. All of the keys 10, 11, 12 and 13 are pivotally mounted upon a transverse shaft 14 (Figs. 2 and 5) supported in side frames 15 and 16. Common to all of the keys 10, 11, 12 and 13 is a key coupler 17 of a form well known in the art and fully described in the aforesaid Carney and Cleal patents. The key coupler 17 is pivoted at 18 at each end in the side frames 15 and 16, and normally rests on the rear ends of the purchase keys 10 and "no sale" key 13. Each of the purchase keys 10 and the "no sale" key 13 is provided with a notch 19 (Fig. 2) which is adapted to cooperate with the lip 20 formed on the rear edge of the key coupler 17 when any of the keys 10 or key 13 is depressed.

Figure 6:
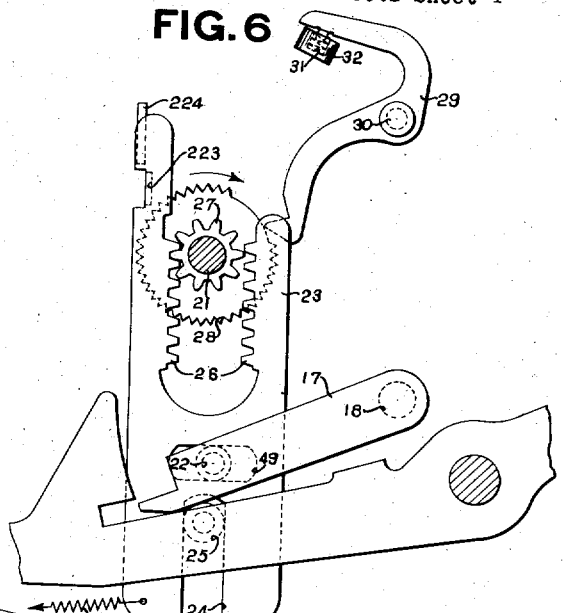
Fig. 6 is a detail section partly broken away of the mechanism for rotating the common operating shaft.

Suitably mounted in the side frames 15 and 16 is a transverse rotary shaft 21 which is adapted to be given a complete rotation upon each reciprocation of the key coupler 17 by the mechanism shown in detail in Fig. 6. By referrring to said figure it will be noted that at its right hand end the coupler 17 is provided with a stud 22 which projects into an elongated slot 49 formed in the vertically reciprocable double rack 23. At its lower end the double rack 23 is provided with an open slot 24 which straddles a stud 25 carried by the right hand side frame 16. At its upper end the rack 23 is also slotted and the inside walls of the slot are furnished with oppositely faced rack teeth 26 which cooperate with a pinion 27 fast on the rotary shaft 21. At the end of the down stroke of the key 10, lug 223 (Fig. 6) is at the top of lug 224 on the frame 16 and spring 227 is then above the pivot 25 and rocks the rack 23 counter-clockwise about pivot 25 thereby disengaging the left hand teeth 26 from the pinion 27 and engaging the right hand teeth 26 with the pinion 27. The lug 223 then comes down on the left side of lug 224, and when the rack is way down, spring 227 rocks it clockwise to the position shown. This mechanism is substantially the same in construction and operation as the mechanism shown in the aforesaid Carney and Cleal patents and also in the patent to Cleal, No. 773.060, issued October 25, 1904, and is for the accomplishment of the same purpose, that is the giving of a complete rotation of the shaft 21 at each reciprocation of the key coupler 17 the rotation being in the direction of the arrow shown in Figs. 2 and 6. In order to prevent a retrograde movement of the shaft 21 a ratchet or full stroke disk 28 is made fast to the right hand end of the shaft 21 and cooperates with a pivoted full stroke pawl or lever 29 pivoted at 30 to the frame of the machine and held in engagement with the ratchet 28 by a spring 31 seated in the lug 32 on the right hand side frame 16.

It will thus be seen upon each complete depression of a purchase key 10 or "no sale" key 13 the key coupler 17 will be reciprocated and through the connections shown in Fig. 6 and above described, a complete single rotation will be given to the shaft 21. The function of the key coupler 17 as well known in the art is to permit the starting of an operation of two keys, for example, the dollar key and the twenty-cent key and then complete the operation by pressing either one of the two keys. By reason of the engagement of the lip 20 of the key coupler with the notches 19 in the key 10 both the dollar key and the twenty-cent key will be fully operated by the complete depression of either one of the two.

*Tax keys.*

The tax keys 11 and the "no tax" key 12 are of a different construction than the keys 10 and 13. The construction of these keys is substantially that shown in United States Letters Patent to E. J. Hall No.

875,661 dated December 31, 1907 and W. G. Doty, No. 823,516, issued June 19, 1906.

Figure 5:
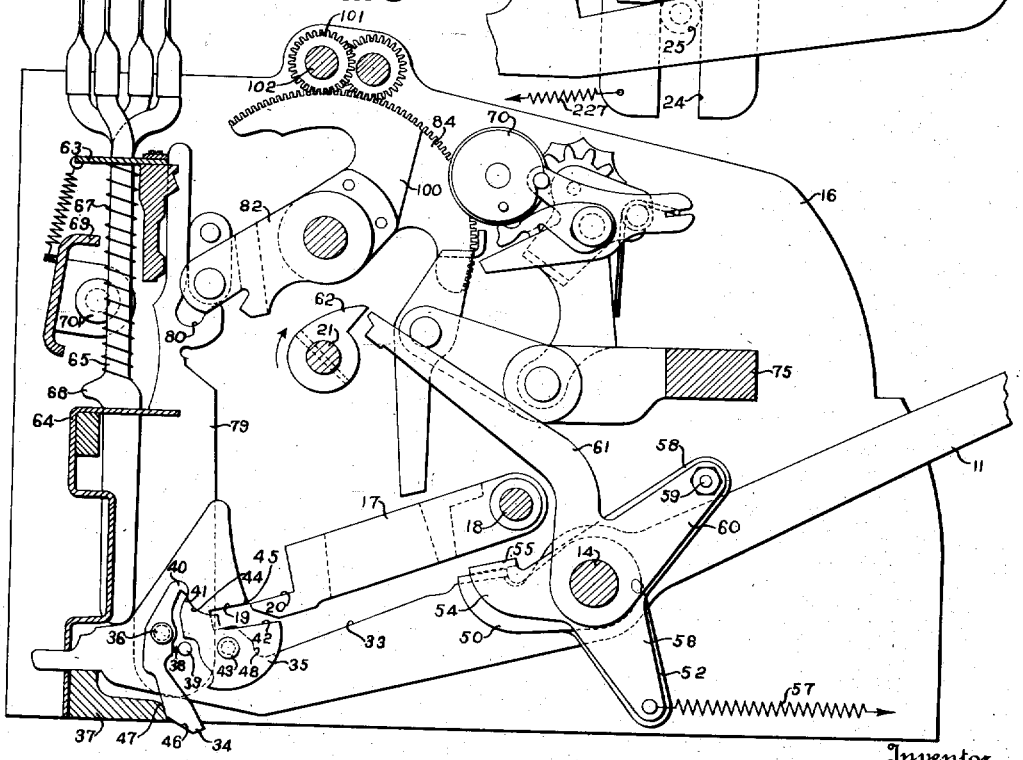
Fig. 5 is a section of the machine taken on the line 5—5 of Fig. $1^A$ looking in the direction of the arrow, certain parts being omitted for the sake of clearness.

The keys 11 and 12 are of the construction shown in Figure 5. It will be noted that these keys 11 and 12 are cut away as at 33 so that when the key coupler 17 is resting on the keys 10 and 13, as shown in Fig. 2, it will not be resting on the keys 11 and 12. The keys 11 and 12 are provided with a notch 19 for cooperating with the lip 20 of the key coupler 17 in the same manner as the notches 19 of the keys 10 and 13 cooperate with said lip 20 as hereinbefore described.

By reason of the cut-away portion 33 of the keys 11 and 12, any one or more of the keys 11 and 12 may be given an initial depression independent of any movement of the key coupler 17. This initial depression of the keys 11 and 12 is for the purpose of unlatching the purchase keys and "no sale" key to permit an operation of the latter keys in a manner to be hereinafter described.

Each of the keys 11 and 12 has pivotally mounted near its rear end a pair of pawls 34 and 35. This construction is substantially like the constructions shown in the Hall and Doty patents just above referred to and is for the purpose of holding the keys 11 and 12 in the partially depressed position. The normal positions of the pawls 34 and 35 are substantially that shown in Fig. 5 wherein it will be seen that the pawl 34 which is pivoted at 36 is normally held against a stationary frame portion 37 by a spring 38 interposed between the lower end of the pawl and a stud 39 carried by each of the keys. At its upper end the pawl 34 is provided with a hook end 40 adapted to cooperate with a locking point 41 of the pawl 35 as will be hereinafter described. When any one of the keys 11 and 12 is depressed the rear end of the key will be elevated until the lower end of the pawl 34 passes clear of the stationary frame portion 37 when, under the action of spring 38, the lower end of said pawl will move rearwardly above the frame portion 37. When the pressure on the forward end of the key 30 is removed the pawl 34 engaging with the frame portion 37 will hold the rear end of the key elevated. As the rear end of the depressed key moves upward the face 42 of the pawl 35 will strike the under side of the lip 20 of the key coupler 17 and during the continued operation of the keys 11 or 12 the pawl 35 will be rocked clockwise around its pivot 43 carrying the point 41 away from the hook 40 of the pawl 34 and bringing a face 44 across the notch 19 in the depressed key. This initial depression of any of the keys 11 or 12 will, when the rear end of the key is elevated, cause the point 45 which is at the outer end of the notch 19 to cross the arc of movement of the rear edge of the lip 20 of the key coupler 17. Consequently when the key coupler 17 is rocked clockwise about its pivot 18 by the depression of a key 10 or 13 the lip 20 will engage the point 45 at the outer end of the notch 19 of the key 11 or 12 and upon the continued movement of the coupler 17 under the control of a key 10 or 13 the rear end of the partially depressed key or keys 11 or 12 will be carried upward with the key coupler 17 thereby completing the operation of the previously partially depressed key.

As this operation takes place the lip 20 will enter the notch 19 of the key 11 or 12 and engage the face 44 of the pawl 35. During the continued operation of the key coupler 17 the pawl 35 will be rocked counter-clockwise about its pivot 43, (Fig. 5), until the point 41 of the pawl 35 will be brought into position adjacent the hook 40 of the pawl 34. At this time the pawl 34 will have passed free of the frame portion 37. The spring 38 will then be effective to rock the pawl 34 about its pivot 36 in a clockwise direction causing the hook portion of the pawl 34 to engage and lock over the point 41 of the pawl 35. This will hold the face 42 of the pawl 35 rigid against the under side of the lip 20 of the key coupler 17. When the keys 10, 11, 12 and 13 have completed their movement in one direction, pressure is released on the outer end of the keys and by reason of the weight of the key coupler 17 the rear ends of the depressed keys are moved downward toward normal position. As the key coupler rests on the keys 10 and 13 this downward or counter-clockwise movement of the key coupler 17 will be applied directly to the key. However, as the cut away portion 33 of the keys 11 and 12 does not permit of the key coupler 17 contacting directly with said keys, the lip 20 resting on the face 42 of the pawl 35 will perform the function of restoring the keys 11 and 12 to normal position. As the keys 11 and 12 reach their normal position a beveled rear face 46 formed on the lower end of the pawl 34 will engage the curved forward edge 47 of the frame portion 37 and upon the continued restoring movement of the keys 11 and 12 the pawls will be rocked counter-clockwise about their pivots 36 thereby disengaging the hook portion 40 from the point 41 of the pawls 35, the parts then being again in the position shown in Fig. 5.

It will be noted that when a key 11 or 12 has been partially depressed a wall 48 at the rear end of the cut away portion 33 will engage the rear edge of the lip 20 of the coupler 17, and because of the intersecting arcs of movement of the keys and coupler, the raising of the rear edge of the coupler 17 by a key 11 or 12 is prevented.

Figure 7:
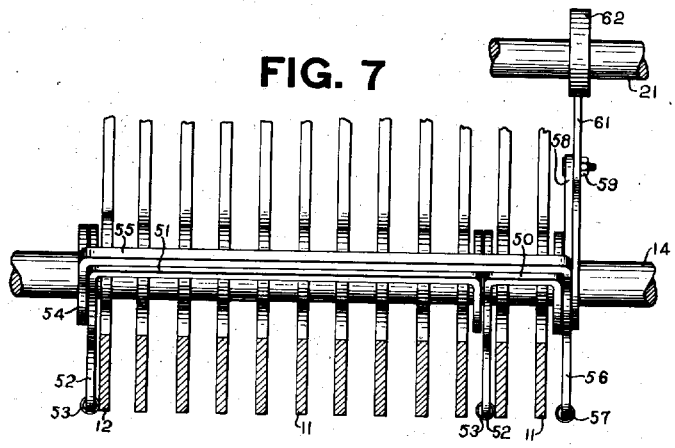
Fig. 7 is a view looking from the back and shows the device controlled by the tax keys for releasing the revolution shaft.
Figure 8:
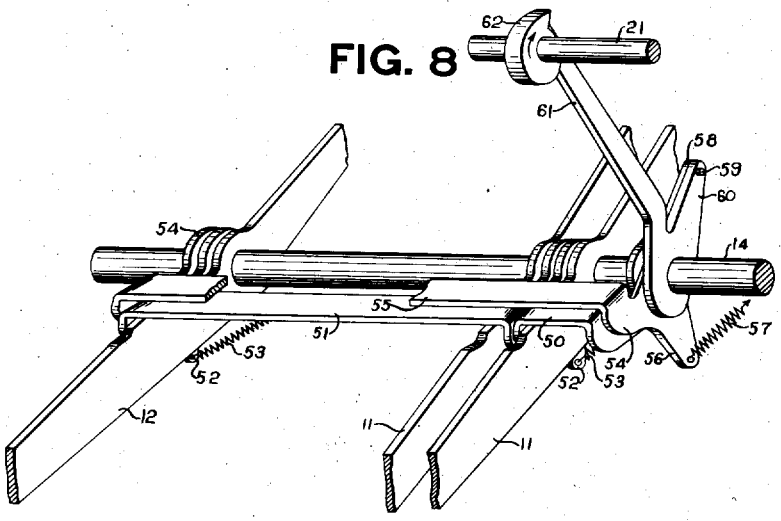
Fig. 8 is a perspective view looking from the rear and shows the releasing device for the revolution shaft and how said device is operated.

The keys 11 (Fig. 1[A]) comprise digit keys 1 to 9 inclusive which are the units or penny tax keys and the keys 10 and 20 which are the tens of cents tax keys. In order to assist in restoring the keys 11 and 12 to normal position and also hold said keys in normal position there are provided two yoke members 50 and 51 (Figs. 7 and 8). The yoke member 50 is yoked over the two tens of cents keys just to the rear of the transverse shaft 14. The yoke 51 is the longer one of the two and is yoked over all of the units of tax keys 1 to 9 inclusive, and also the "no tax" key 12. The arms of the yokes 50 and 51 are pivoted on the shaft 14. The right hand arm of both of the yokes 50 and 51 as shown in Figs. 1A, 5 and 7 are formed with downward extensions 52 to which are connected springs 53 and also secured to a forward portion of the frame of the machine. The springs 53 normally tend to draw the lower ends of the arms 52 forward thereby holding the yokes 50 and 51 in contact with the upper edges of the keys 11 and 12.

*Lock for purchase keys.*

Pivotally mounted upon the shaft 14 are the arms 54 of a third yoke 55 (Figs. 1A, 5, 7 and 8) which normally rests upon the yokes 50 and 51. The left hand arm 54 has a downwardly extending arm 56 to which is connected a spring 57 which normally holds the yoke 55 in contact with the yokes 50 and 51. The arm 54 is further provided with a forwardly and upwardly extending arm 58 which is connected by a bolt 59 to a forward arm 60 of a lever 61 pivoted on the shaft 14. The lever 61 extends upwardly and rearwardly as shown in Fig. 5, and has its upper rearward end normally in the path of movement of an obstruction 62 in the form of a small cam. The obstruction 62 is pinned to the rotary shaft 21. A notch is shown as formed in the rear end of the lever 61 for the purpose of preventing a release of the revolution shaft 21 by a movement of the keys 11 or 12 less than the required initial movement.

It will be seen from the construction which is above described that as long as the keys 11 and 12 remain in their undepressed positions the lever 61 will stand in the position shown in Fig. 5 thereby obstructing the movement of the obstruction 62 thereby locking the shaft 21 against movement. Consequently any attempt to depress a key 10 or 13 without first partially depressing the key 11 or 12 will be frustrated, as the key coupler 17 cannot be then rocked clockwise (Fig. 6) to rotate the shaft 2.

If either a key 11 or 12 is first partially depressed, as above described, it will engage and rock its appropriate yoke 50 or 51, the rocking of which yoke will rock the yoke 55 about the shaft 14, thereby rocking lever 61 to carry its upper rearward end out of the path of movement of the obstruction 62 thereby permitting the rotation of the shaft 21. This in turn will permit the operation of a key 10 or 13. When a key 10 or 13 is then depressed, the key coupler 17 will be moved clockwise about its pivot 18 thereby coupling all of the keys 10 or 13 which have been operated so as to move as a unit and also cause said coupler 17 to engage the keys 11 or 12 which have been operated, thereby completely operating said latter keys.

*Indicating mechanism.*

Slidably mounted in the frame plates 63 and 64 just above the rear end of each of the keys 10, 11, 12 and 13 is an indicator rod 65 which carries at its upper end an indicator tablet 66 of a type fully shown and described in the hereinbefore mentioned Carney and Cleal patents. The indicator rods 65 are held in lowermost position by springs 67 so that the lower ends of all of the indicator rods 65 are in contact with the rear ends of the keys 10, 11, 12 and 13. Each of the indicator tablets 66 bears a special character or characters which are preferably identical with the character or characters appearing on the forward ends of their appropriate keys 10, 11, 12 and 13. When any of the keys are depressed, the indicator rods 65 will be elevated against the tension of the springs 67 carrying the tablets 66 upward until a projection 68 carried by the indicator rods 65 passes above a rocking bail 69 pivoted at 701 at either end to the side frames 15 and 16. The construction and operation of this bail is old and well known in the art and will not be described in detail here. Its purpose is to hold the indicator rods 65 appropriate to the depressed keys in elevated position between operations of the machine so as to sustain an indication between operations of the machine thereby showing which keys were depressed in the previous operation. It will thus be seen that when any one of the keys 10, 11, 12 and 13 is depressed the proper indicator tablet 66 will be raised and publicly exposed through sight openings in the cabinet which are commonly provided in cash registers so as to indicate which of the keys 10, 11, 12 and 13 have been operated.

*Totalizers.*

As hereinbefore stated in the early part of the description, the machine is provided with two totalizers 70 and 71. The totalizer 70 (Fig. 5) normally lies at the left hand end of the machine just above the tax keys 11 and 12 (Fig. 5) but is omitted from Fig. 1A for the sake of clearness in showing the yokes 50, 51 and 55 which are operated by the tax keys 11 and 12.

Figure 1B:
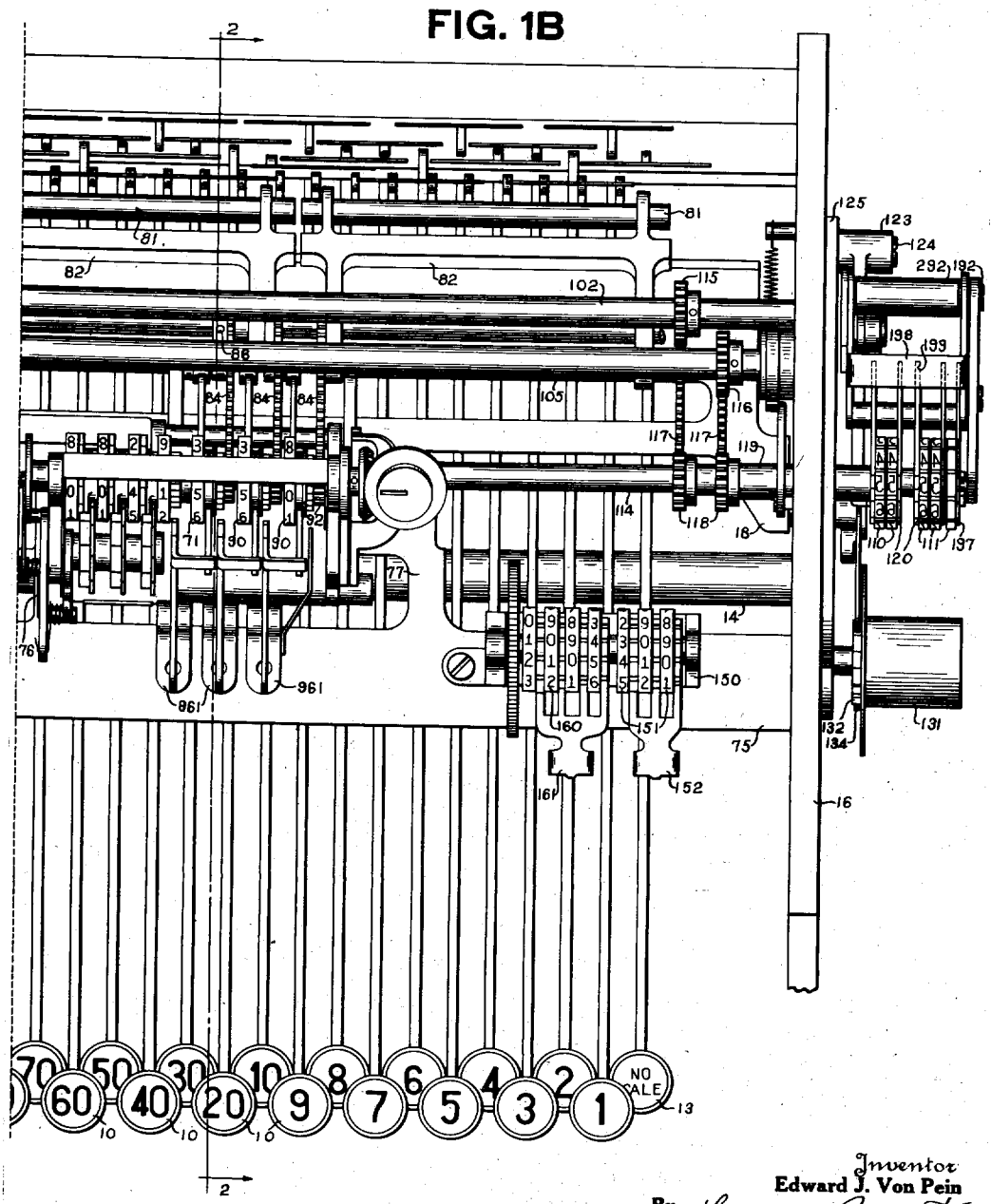

The totalizer 71 (Fig. 2) lies to the right (as shown in Fig. 1B), just above the purchase keys 10.

The construction and operation of the two totalizers 70 and 71 are identical and for convenience the left hand totalizer 70 will be hereinafter called the "tax" totalizer and the right hand totalizer 71 will be hereinafter called the "purchase" totalizer.

The "tax" totalizer 70 is pivotally supported by brackets 73 and 74 carried by a forward tie bar 75 constituting part of the frame of the machine. The "purchase" totalizer is supported by brackets 76 and 77 also carried by a tie bar 75.

Pivotally mounted at 78 (Figs. 2 and 5) to each of the keys 10 and 11 is an upwardly extending member 79 which is formed near its upper end with a notch 80. The notches 80 of the various members are located different distances from the pivotal point 78 of the members 79 thereby enabling the giving of graduated movements to the registering mechanism of the machine by the operation of the various keys 10 and 11.

As the construction and operation of the "tax" and "purchase" totalizers is identical it is thought that the description with reference to the "purchase" totalizer will be sufficient to enable any one skilled in the art to understand the operation of both totalizers.

Referring to Fig. 2 the notch 80 of the member 79 is adapted to engage a cross rod 81 when any one of the keys 10 is depressed. The cross rod 81 is carried by a rocking frame 82 pivotally mounted upon a rock shaft 83 supported in the side frames 15 and 16. A rocking frame 82 is provided for each of the three groups of keys 10; that is, one for the pennies group, comprising the keys 10, numbered 1 to 9 inclusive; one frame for the tens of cents group, comprising the keys 10 to 90 inclusive; and a third frame for the dollars group, comprising the one and two dollar keys. It will thus be seen that when any one of the keys 10 is depressed it will rock its appropriate frame 82 different distances according to the location of the notches 80 of their appropriate members 79. The frame 82 (Figs. $1^A$ and $1^B$) for the units of cents keys 10 is loosely pivoted on the rock shaft 83 and has fast thereto at its left hand end a rack segment 84. The frame 82 appropriate to the tens of cents keys 10 has fast thereto on its right hand end a similar segment 84. The frame 82 appropriate to the dollars keys 10 is pinned as at 85 to the rock shaft 83, consequently any movement of the frame 82 of the dollars keys 10 will be transmitted to the rock shaft 83. Also pinned to the rock shaft 83 as at 86 (Fig. $1^B$) is a third rack segment 84 to which is transmitted rocking movements of the frame 82 of the dollar keys 10 through the medium of the rock shaft 83.

It will thus be seen that the operation of the pennies, dimes and dollars purchase keys 10 will be transmitted to the three rack segments 84 (Fig. $1^B$) through the medium of the appropriate frames 82.

The "purchase" totalizer is substantially identical in construction and operation with the totalizer shown in the Carney and Cleal patents hereinbefore referred to, but will be described briefly as follows:

*Purchase totalizer.*

The "purchase" totalizer 71 comprises a plurality of totalizer elements 90 in the form of wheels rotatably mounted upon a shaft 91 suitably supported in the rocking totalizer frame 92. The wheels 90 bear on their peripheries, stamped numerals running from "1" to "9" and "0" inclusive. In Fig. $1^B$ it will be noted that the totalizer comprises seven of such wheels 90. The three wheels of lower numerical order, that is the three wheels to the right in Fig. $1^B$, are each fast to a pinion 93 each of which is normally in operative alinement with one of the registering rack segments 84. In the normal position of the frame 92, however, the pinions 93 are out of operative engagement with the registering segments 84, as shown in Fig. 2. Upon the rotation of the shaft 21, a cam 95 rigidly mounted thereon will cooperate with anti-friction rollers 96 carried by an arm 97 operatively connected to the rocking totalizer frame 92. When the shaft 21 is rotated upon a depression of one of the purchase keys 10, the cam 95 is effective to rock the totalizer frame 92 through the medium of the arm 97, so as to carry the "purchase" totalizer rearward to engage the totalizer pinions 93 with the registering rack segments 84 before any movement of the registering rack segments 84 and the frames 82 is begun. This engagement of the pinions 93 with the registering rack segments 84 is continued throughout the downward movement of the outer ends of the keys 10. At the completion of the downward movement of the outer ends of the keys 10, which is the end of the registering stroke of the keys, the cam 95 will then act upon the arm 97 to rock the totalizer frame 92 to carry the "purchase" totalizer forward to disengage the pinions 93 from the registering rack segments 84. During the return movement of the keys 10, therefore, and the consequent restoring movement of the registering rack segments 84, the pinions 93 will remain disengaged so that the return movement of the segments 84 will have no effect upon the totalizer elements.

Suitable transfer mechanism, comprising the transfer pawls 961 carried by rocking arms 971, which latter are operated by cams 98 fast on the rotating shaft 21, is provided for performing the function of carrying from the totalizer elements of lower order to the elements of higher order at the proper time in the rotation of the totalizer elements 90. This transfer mechanism, however, is old and well known in the art and is fully described in the hereinbefore mentioned Carney and Cleal patents. It will thus be seen that upon each actuation of one or more of the purchase keys 10, the purchase totalizer will be rocked to engage the pinions of the totalizer with the registering rack segments 84 so as to enter upon the purchase totalizer the amount of the purchase as represented by the keys depressed. Means is also shown for resetting the totalizer wheels to zero by rotating the shaft 91 but as this is old and well known in the art it will not be described in detail here.

*Tax totalizer.*

The operation of the "tax" totalizer will be briefly described as follows, it being thought unnecessary to go into the description in detail, in view of the fact hereinbefore mentioned that the operation of the "tax" and "purchase" totalizers is identical.

The units tax keys 11, running from 1 to 9 inclusive, carry members 79 having graduated notches 80, as shown in Fig. 5. The members 79 cooperate with rocking frames 82 similar in construction to the rocking frames for the purchase keys. There are two rocking frames 82 for the tax keys as shown in Fig. 1A. The left hand rocking frame 82, as shown in Fig. 1A, is pivoted on the rocking shaft 83 and has fast thereto at its right hand side a segment 100 (Figs. 1A and 5). The segment 100 has rack teeth formed thereon meshing with a pinion 101 fast on a transverse shaft 102 suitably mounted in the side frames 15 and 16. The shaft 102 also has fast thereon a pinion 103 which meshes with a registering rack segment which has been numbered 84 as it is constructed and operated and performs the same function as the registering segments 84 for the "purchase" totalizer.

The right hand frame 82 for the penny tax keys 11 is also pivoted on a rock shaft 83 and has fast to its right hand end a similar segment 100. This segment 100 meshes with a pinion 104 pinned to a transverse shaft 105 also suitably supported in the side frames 15 and 16. The shaft 105 has fast thereon a pinion 106 which meshes with a registering segment 84.

Through the connections just described the two registering segments 84 (Fig. 1A) receive movement of varying extents according to the keys 11 which are operated, the right hand one of the segments being controlled as to extent of actuation by units tax keys 11, while the left hand one receives an extent of movement appropriate to the tens of cents tax key 11 which is operated.

The "tax" totalizer is shown at 70 in Fig. 5 and in construction is identical with the "purchase" totalizer, the same mechanism being employed for engaging the totalizer pinions with the registering rack segments 84, as in the case of the "purchase" totalizer. The mechanism for engaging the "tax" totalizer, however, has been omitted for the sake of clearness in the drawings.

It will thus be seen that upon the operation of any one or more of the tax keys 11 the amount of the tax will be entered on a "tax" totalizer so that the "tax" totalizer will show the total amount of tax which is recorded on the machine. At the same time the indicating tablet 66 appropriate to the tax keys 11 will be elevated to indicate the amount of tax which is registered for each taxable purchase.

*Printing mechanism.*

For the purpose of printing upon a detail record strip to be retained in the machine the amount of the purchase, together with the tax to be assessed, the movements of the registering segments for both the "tax" and "purchase" totalizers are transmitted to printing wheels 110 for printing the amount of tax, and 111 for printing the amount of the purchase. Referring to Fig. 2, each of the registering segments 84 of the "purchase" totalizer meshes with a pinion 112, the left hand pinion being fast on a cross shaft 113, while the other two pinions are fast on the left hand ends of nested sleeves 114 supported on the shaft 113. The shaft 113 and sleeves 114 extend to the right (Fig. 1B) through the side frame 16 and have fast on their right hand ends the printing wheels or elements 111. The shafts 102 and 105 which receive differential actuation from the two registering frames 82 of the tax keys 11, extend to the right, and at their right hands carry pinions 115 and 116 respectively. The pinions 115 and 116 each mesh with one of a pair of segments 117, which are loosely pivoted on the rock shaft 83. The segments 117 mesh with pinions 118 fast on the left hand end of sleeves 119 which extend to the right through the right hand side frame 16 and carry on their right hand ends the printing elements or wheels 110 for the printing of the tax.

Through the connections just above described the printing elements or wheels 110 and 111 will be adjusted during the registering strokes of the keys 10 and 11 to positions representing values of the keys depressed, both for the tax and the amount of purchase. The wheels 110 and 111 bear on their peripheries type 120. Just beneath the type wheels 110 and 111 (Fig. 3) is a platen 121 for the purpose of taking an impression, from the raised type 120, on a detail strip 122. The platen 121 is carried on the forward end of an arm 123 pivoted at 124 on a sub-frame 1251 mounted on the right hand side frame 16, the sub-frame 1251 serving to support all of the parts of the printing mechanism.

Mounted on the right hand end of the rotary shaft 21 is a scroll cam 125 which cooperates with projection 126 carried by the platen arm 123. Interposed between the arm 123 and a lug 127 on the printer frame 1251 is a spring member 128 which serves to hold projection 126 of the platen arm 123 in contact with the periphery of the scroll cam 125. The shaft 21 is rotated counter-clockwise, as viewed in Fig. 3, and it is obvious that as the shaft 21 rotates, the portion of the scroll cam 125 of increasing radii will serve to rock the platen arm 123 counter-clockwise about its pivot 124 until the cam reaches its point of greatest radius. At this time the downward or registering stroke of the forward end of the keys 10, 11, 12 and 13 has been completed and the wheels 110 and 111 have been adjusted to positions representing the amount of tax and the amount of purchase. Then upon the continued rotation of the shaft 21 the high point of the scroll cam 125 will pass the projection 126 of the platen arm 123, thereby permitting the spring member 128 to act to throw the platen 121 against the adjusted type 120, thereby causing an impression to be made on the detail strip 122.

The detail strip 122 is led from the supply roll 129 about two studs 130 on the printer frame 1251 to a receiving roll 131. The receiving roll 131 has fast on its left hand side a ratchet wheel 132. Cooperating with the ratchet wheel 132 is a hook arm 133 having its hook end 134 held in engagement with the ratchet 132 by a spring 135. The arm 133 is pivotally mounted upon an arm 136 fast on the right hand end of the trunnion 18 of the key coupler. Consequently, the arm 136 receives a reciprocating movement on the reciprocating movement of the key coupler 17. This reciprocating movement of the arm 136 acts through the arm 133 pivoted thereon to rotate the ratchet 132 and receiving roll 131 the distance of one tooth of the ratchet 132 in a counter-clockwise direction. A spring held pawl 232 is provided to prevent retrograde movement of the receiving roll. Consequently, this advances the detail strip a single space at each operation of the machine, so that the printed items are printed successively on the detail strip in the order that they are entered on the totalizers, as shown in Fig. 1[B].

An inking ribbon 180 is provided for giving a properly inked impression on the detail strip 122. The ink ribbon 180 is a continuous ribbon passing about an ink roll 190, a guide stud 191, a roll 292 on the stud 192 and a guide roll 193. In order to keep the proper tension on the ink ribbon 180 there is provided a roll weight 194 carried by a frame 195 pivoted on the stud 296. This weight bears on the ribbon and holds the ribbon taut as shown.

For the purpose of holding the positioned type alined while an impression is being taken, each of the type wheels 110 and 111 has fast to its side a star disk 197. The star disks 197 have cooperating therewith a series of alining fingers 198 pivotally mounted at 199 in a frame 196 which is pivoted on the stud 192. Springs 297 are provided for holding the fingers 198 yieldingly in contact with the star disks 197 when they are thrown into engagement therewith. For the purpose of throwing the alining fingers 198 into engagement with the star disks 197, the frame 196 is formed with a two-armed downwardly extending member 200 which cooperates with a cam 201 fast on the revolution shaft 21. The cam 201 is so formed that at the proper time during the rotation of the shaft 21 which is immediately upon the completion of the adjusting movement of the type wheels 110 and 111, said cam will be effective to rock the frame 196 through the medium of the member 200 to engage the alining fingers 198 with the notches formed in the star disks 197. After an impression is taken and before the keys start on their return stroke, the frame 196 is rocked clockwise (Fig. 3) to disengage the locking fingers from the notches in the star disks 197.

The printing wheels 110 and 111 are spaced apart so that, as shown in Fig. 4, the printed impressions will appear in colums, the left hand column 137 representing the amount of the purchase and the right hand column 138 representing the amount of the tax. By examination of the portion of the detail strip 122 (Fig. 4) it will be noted in the left hand column there appears one item which has been marked 139. This item consists of two zeros; this indicates that the machine has been operated without depressing one of the keys 10 but by pressing the "no sale" key 13. Immediately to the right of the entry 139 is a similar entry of two zeros in the tax column, which entry has been marked 140. As no purchase was made and the "no sale" key 13 was used, no tax would be assessable, therefore the "no tax" key 12 was depressed and consequently the tax printing wheels 110 have been caused to print two zeros on the detail strip. Just above the tax entry 140 is a similar entry 141, comprising two zeros. Adjacent these two zeros is an item marked 142 which shows a purchase of 30¢. As this was for the sale of non-taxable goods, the printed entry shows that the machine was operated by pressing the "no tax" key 12 and then pressing the 30¢ purchase key 10.

The detail strip 122 therefore shows in every instance the amount of the purchase accompanied by an item in the right hand column showing the amount of tax assessable for that purpose in the case of a taxable sale, while zeros are printed when the "no tax" key is used in connection with the transaction involving non-taxable articles.

*Special counters.*

For the purpose of showing the number of times that the "no sale" key 13 has been operated, there is provided a step-by-step counter of the Veeder type (Figure 1[B]) bearing the reference numeral 150. This step-by-step counter 150 comprises three number wheels 151 operated by a multiple tined pawl 152 pivotally mounted to the upper end of an arm 154 pivoted on a short shaft 155 mounted on the tie bar 75. The arm 154 carries at its lower end a pin 156 which projects into a slot 157 formed in an arm 158 pinned at 159 to the "no sale" key 13. Through this connection each operation of the "no sale" key 13 effects a reciprocation of the multiple tined pawl 152 so as to add one on the units wheel of the counter.

For the purpose of showing the number of times the machine has been operated, an additional step-by-step counter 160 is provided. This counter 160 is operated by a multiple tined pawl 161 carried by the upper end of an arm 162 also pivoted on the short shaft 155 and having at its lower end a pin 163 projecting into a slot 164 formed in the upper end of a lever 165 pivoted on the cross shaft 14 which supports the keys 10, 11, 12 and 13. At its rear end the lever 165 is formed with a hook 166 which hooks over the lip 20 on the key coupler 17. Consequently, upon each actuation of the key coupler 17, the lever 165 is rocked about the shaft 14, and through the medium of the arm 162 and the multiple tined pawl 161, the counter 160 is advanced one step or unit upon each operation of the key coupler 17.

For the purpose of keeping an account of the number of times the "no tax" key has been operated, the "no tax" key is provided with an arm similar to the arm 158 on the "no sale" key. This arm 158 for the "no tax" key is identical in construction with that of the "no sale" key and cooperates with a similar pin 156 carried by an arm 171 fast on a shaft 172 suitably supported in brackets 173 carried by the tie bar 75. Mounted on the left hand end of the shaft 172 is an arm 174 which carries a multiple tined pawl 175 which actuates the wheels of an additional step-by-step counter 176. Consequently, upon each operation of the "no tax" key 12 the counter 176 will be advanced one step or unit and will show the number of times that the "no tax" key has been operated.

*General operation.*

The general operation of the machine, therefore, comprises the following steps:

Supposing the machine to be used in a soda fountain where a tax of one cent is to be assessed for each ten cents of purchase or fraction thereof. Taking as an example the purchase of a five-cent soda, the operator will operate the machine as follows:

For a five-cent soda the tax will be one cent, consequently the one-cent tax key 11 is depressed partially and by the mechanism hereinbefore described that key is held in partially operative position. This partial operation of the tax key 11 releases for operation the rotary shaft 21. Consequently the purchase keys 10 may then be operated to complete the operation of the machine. The purchase being five cents, the operator presses the five-cent purchase key 10. The operation of the key 10 will act to complete the operation of the previously and partially operated tax key 11. The one-cent tax will be properly registered on the "tax" totalizer 70 and the amount of the purchase, five cents, will be properly registered upon the "purchase" totalizer 71. At the same time, the indicator appropriate to the one-cent tax key 11 will be elevated and publicly exposed and the five-cent purchase key 10 will likewise be elevated. At the same time, the printing elements will be adjusted so as to print five cents in the purchase column and one cent in the tax column, as indicated by the first item at the top of the columns in the detail strip in Fig. 4.

If a sale is then made of goods which is not taxable, the operator first presses the "no tax" key. This serves through the operating of the yoke 55 to release for operation the rotary shaft 21. The purchase keys 10 are then free to be operated and the operator will depress the twenty-cent purchase key 10 if that be the amount of the purchase. The twenty-cent purchase will properly be entered upon the purchase totalizer, while no entry will be made upon the tax totalizer. The indicator tablet 66 for the "no tax" key will be raised to exposed position while the twenty-cent indicator appropriate to the twenty-cent purchase key will also be raised to exposed position. At the same time, the printing elements 110 and 111 will be adjusted to positions to make the fourth entry from the top on the portion of the detail strip 122 as shown in Fig. 4 which shows a twenty-cent purchase and no tax.

On a "no sale" transaction, the "no tax" key 12 is first depressed; this serves to unlock the shaft and the "no sale" key 13 is then depressed. This results in an indication of "no tax" and "no sale," no registration is made on either of the two totalizers and a printed entry indicated by reference numerals 139 and 140 is made on the detail strip 122, as shown in Fig. 4.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a plurality of sets of manipulative devices, an operating member common to all of said devices and operated by the devices of one set said member carrying an obstruction, a rocking frame operated by the devices of another set, and an arm carried by said rocking frame normally engaging the obstruction on the operating member to prevent movement of said member.

2. In a machine of the class described, the combination of a plurality of sets of keys, the keys of one set being adapted to receive a partial operation as a preliminary to an operation of a key in the other set, means common to the two sets of keys, whereby the keys of the two sets may be simultaneously and completely operated, an operating member driven by the common means, an obstruction on the operating member, and a member common to the partially operable keys and normally coperating with said obstruction for preventing the driving of the operating member.

3. In a machine of the class described, the combination of a plurality of sets of keys, the keys of one set being adapted to receive a partial operation as a preliminary to an operation of a key in the other set, means common to the two sets of keys whereby the keys of the two sets may be operatively connected for simultaneous movement, an operating member driven by the common means, an obstruction on the operating member, and a member common to the partially operable keys and normally coperating with said obstruction for locking the operating member.

4. In a machine of the class described, the combination of a plurality of sets of keys, the keys of one set being adapted to receive a partial operation as a preliminary to an operation of a key in the other set, means common to the two sets of keys whereby the keys of the two sets may be operatively connected for simultaneous movement, an operating member driven by the common means, an obstruction on the operating member and a rocking frame common to the partially operable keys and normally cooperating with said obstruction for locking the operating member.

5. In a machine of the class described, the combination of a plurality of sets of keys, the keys of one set being adapted to receive a partial operation as a preliminary to an operation of a key in the other set, means common to the two sets of keys whereby the keys of the two sets may be operatively connected for simultaneous movement, an operating member driven by the common means, an obstruction on the operating member, and a member common to the partially operable keys and normally cooperating with said obstruction for locking the operating member and spring means for normally holding said common member in locking position.

6. In a machine of the class described, the combination of a plurality of sets of keys, the keys of one set being adapted to receive a partial operation as a preliminary to an operation of a key in the other set, means common to the two sets of keys whereby the keys of the two sets may be operatively connected for simultaneous movement, an operating member driven by the operating means, an obstruction on the operating member, a rocking frame common to the partially operable keys and normally cooperating with said obstruction for locking the operating member, and spring means for normally holding said rocking frame in locking position.

7. In a machine of the class described, the combination of a plurality of sets of manipulative devices, an operating member common to all of said devices and operated by the devices of one set said member carrying an obstruction, and a rocking frame operated by the devices of another set and normally engaging said obstruction to prevent movement of said operating member.

8. In a machine of the class described, the combination of a plurality of sets of manipulative devices, an operating member common to all of said devices and operated by the devices of one set said member carrying an obstruction, a rocking frame normally engaging said obstruction to prevent movement of said operating member, and means operated by the devices of another set for disengaging said frame from said obstruction.

9. In a machine of the class described, the combination of two sets of keys, an operating member common to both sets of keys and operated by the keys of one set said member carrying an obstruction, and a rocking frame operated by a partial operation of the keys of the other set and normally engaging said obstruction to prevent movement of the keys of the first set.

EDWARD J. VON PEIN.